United States Patent

Athenes et al.

[11] Patent Number: 6,064,670
[45] Date of Patent: May 16, 2000

[54] MATRIX FOR SWITCHING BETWEEN TWO MULTIPLEX GROUPS

[75] Inventors: Claude Athenes, Paris; Jean-Claude Audrix, Saint Martin d'Uriage; Jean-Claude Longchambon, Tullins, all of France

[73] Assignee: SGS-Thomson Microelectronics S.A., Gentilly, France

[21] Appl. No.: 08/690,897

[22] Filed: Aug. 1, 1996

[30] Foreign Application Priority Data

Aug. 3, 1995 [FR] France .................................. 95 09639

[51] Int. Cl.$^7$ .......................... H04Q 11/00; H04L 12/50
[52] U.S. Cl. ........................................ 370/375; 370/378
[58] Field of Search ................................. 370/375, 376, 370/371, 369, 370, 372, 379, 382, 378, 383, 386, 388, 413, 427, 419, 317, 360, 366, 374

[56] References Cited

U.S. PATENT DOCUMENTS

| | | | |
|---|---|---|---|
| 4,074,077 | 2/1978 | Charransol et al. | 370/366 |
| 4,093,827 | 6/1978 | Charransol et al. | 370/366 |
| 4,179,587 | 12/1979 | Herschtal | 178/15 AT |
| 4,224,473 | 9/1980 | Kaul et al. | 370/505 |
| 4,455,648 | 6/1984 | Binz et al. | 370/375 |
| 4,512,012 | 4/1985 | Sampei et al. | 370/375 |
| 4,543,652 | 9/1985 | Amada et al. | 370/375 |
| 4,545,053 | 10/1985 | Raamot | 370/379 |
| 4,627,046 | 12/1986 | Bellamy | 370/366 |
| 4,688,208 | 8/1987 | Kawaguchi | 370/15 |
| 4,751,703 | 6/1988 | Picon et al. | 371/10 |
| 4,941,141 | 7/1990 | Hayano | 370/376 |
| 4,959,830 | 9/1990 | Petersen | 370/108 |
| 5,123,012 | 6/1992 | Suzuki et al. | 370/379 |
| 5,197,063 | 3/1993 | Nakano et al. | 370/382 |
| 5,226,042 | 7/1993 | Ardon et al. | 370/68 |
| 5,369,633 | 11/1994 | Maruyama et al. | 370/366 |
| 5,467,340 | 11/1995 | Umezu | 370/14 |
| 5,841,771 | 11/1998 | Irwin et al. | 370/375 |

FOREIGN PATENT DOCUMENTS

| | | | |
|---|---|---|---|
| 0226364 | 6/1987 | European Pat. Off. | H04Q 11/04 |
| 0532914 | 3/1993 | European Pat. Off. | H04Q 11/06 |

OTHER PUBLICATIONS

French Search Report from French Patent Application No. 95 09639, filed Aug. 3, 1995.
NEC Research & Development, No. 90, Jul. 1988, Tokyo (JP), pp. 54–61, H. Nagano, et al. "2048+2048 Time Division Switch VLSI".
International Switching Symposium—Paper 411-1, Oct. 25–29, 1976, Kyoto (JP), pp. 108, H. Fukinuki, et al., "Structure Of Time Division Switching Networks".

Primary Examiner—Chi H. Pham
Assistant Examiner—Steven Nguyen
Attorney, Agent, or Firm—Wolf, Greenfield & Sacks, P.C.; James H. Morris; Theodore E. Galanthay

[57] ABSTRACT

This invention relates to a matrix for switching between two time-division multiplex groups, including three areas for buffering the data arriving in multiplex onto input junctions, which issue these data in multiplex to output junctions according to an assignment of each time slot of an input multiplex to a time slot of an output multiplex, a first area being meant for receiving the data relative to the transmissions as they are issued by a series-to-parallel converter receiving the input junctions and for enabling, at least when the data belong to a transmission channel including several time slots of a same multiplex, a transfer of the data to one of the two other buffer areas according to the parity of the multiplex frame it contains.

18 Claims, 7 Drawing Sheets

MATRIX FOR SWITCHING BETWEEN TWO MULTIPLEX GROUPS

BACKGROUND OF THE INVENTION

1. Field of the Invention

The present invention relates to a matrix for switching between two groups of multiplexes of several input and output channels, respectively. A multiplex, as understood in the invention, is a time-division multiplex transmission (TDM).

2. Discussion of the Related Art

In such a time-division multiplex transmission, a multiplex frame is divided in time slots TS, for example thirty-two, and each time slot includes a determined number of bits, for example eight. To transmit a given channel, it is assigned one or several time slots TS according to the desired rate.

In an application to telephony, or to transmitting digital data via the telephone network, the duration of a multiplex frame of thirty-two time slots TS is standardized to 125 microseconds and each time slot TS includes eight bits. The global rate of such a multiplex is 2.048 Mbits/s and the rate of a given time slot TS is 64 Kbits/s.

Several communications are generally carried by such a multiplex. The function of a switch matrix is then to direct the different incoming communications carried by several incoming multiplexes, for example eight, to a same number of outgoing multiplexes, for example within a telephone switch center, to ensure the connection between two subscribers, whether for a transmission of voice or digital data. In the case of voice, it can be sampled and transmitted by the switch matrix.

Reference will be made hereunder to a matrix for switching between eight incoming multiplexes and eight outgoing multiplexes, each multiplex being constituted by thirty-two time slots, each including eight bits.

Figure 1:
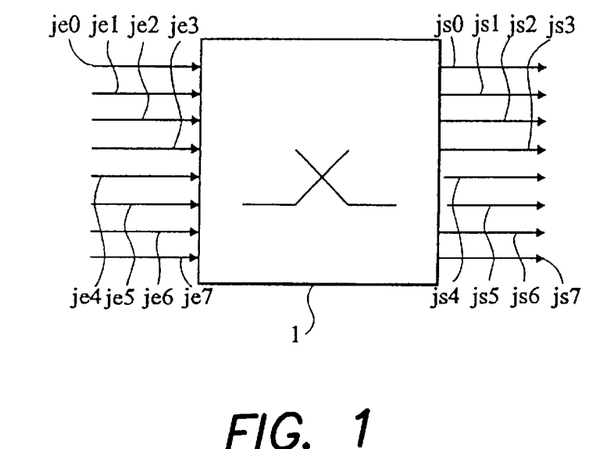
FIGS. 1 to 3, which have been described hereinabove, are meant to display the prior art and the problem to solve.

FIG. 1 illustrates an example of embodiment of a conventional switch matrix 1 operating strictly without contention for transmissions at a maximum rate of 64 Kbits/s.

Matrix 1 includes eight input junctions $JE_0$ to $JE_7$ and eight output junctions $JS_0$ to $JS_7$. Each of the incoming multiplexes arrives onto an input junction $JE_k$ and each of the eight outgoing multiplexes is supplied by an output junction $JS_l$.

Each time slot TS is identified within matrix 1 by an 8-bit address. Three bits of this address identify the number of the multiplex, or of the junction, while five bits identify the number of the time slot TS in the frame of the multiplex considered.

For bidirectional communications, for example voice, a same subscriber is assigned a time slot $ITS_i$ of an incoming multiplex as well as a time slot $OTS_j$ of an outgoing multiplex. These time slots are carried over input and output junctions, or multiplexes, $JE_k$ and $JS_l$, respectively. Assuming that an incoming multiplex is connected to junction $JE_0$ and that the time slot $ITS_4$ of this multiplex is assigned to a subscriber M during a bidirectional communication, the time slot $OTS_4$ of the outgoing multiplex connected to junction $JS_0$ is also assigned to this subscriber M.

A switch matrix is said to be strictly contentionless if, when a subscriber M desires to communicate with a subscriber N and the latter is available, the matrix links the two subscribers with no further condition.

Figure 2:
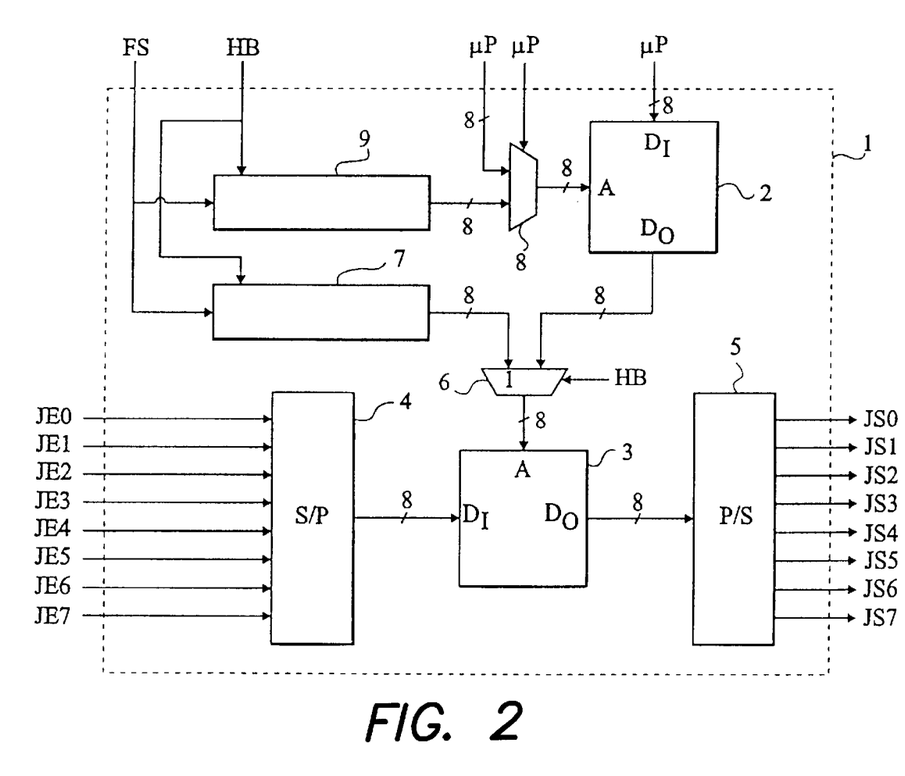

FIG. 2 illustrates a conventional example of implementation of a switch matrix such as shown in FIG. 1.

Matrix 1 is implemented by means of two memories of 256 8-bit words. An assignment memory 2 is meant to contain the paths of the different transmissions, that is, the time slot $ITS_i$ of an incoming multiplex associated, for a given communication, with a time slot $OTS_j$ of an outgoing multiplex. A memory 3 is meant to store the eight bits of each time slot $ITS_i$ relative to the different transmissions arriving in multiplex at junctions $JE_0$ to $JE_7$ so that they can be directed towards junctions $JS_0$ to $JS_7$ depending on the destinations.

Memory 3 receives, via a series-to-parallel converter 4, the data (the eight bits of each time slot $ITS_i$) arriving at junctions $JE_0$ to $JE_7$. It issues them, via a parallel-to-series converter 5, to junctions $JS_0$ to $JS_7$. The addressing of memory 3 is performed by identifying the incoming time slots $ITS_i$. In other words, the 8-bit address includes the number i of the time slot $ITS_i$ on five most significant bits and the number k of the input junction $JE_k$ on the three least significant bits.

The address input A of memory 3 is connected to the output of a two-input first multiplexer 6 having the function of issuing, for each bit cycle, a write address and a read address. In other words, the selection of the input of multiplexer 6 changes for each half-bit cycle and is, for example, controlled by a bit clock HB at the bit rate in the frames of the multiplex. Thus, for each bit cycle, an 8-bit word, corresponding to the contents of a time slot $ITS_i$ of an incoming multiplex and issued by converter 4 to a data input $D_I$ of memory 3, is written into the latter, and an 8-bit word, corresponding to the contents of a time slot $OTS_j$ of an outgoing multiplex, is issued on a data output $D_O$ of memory 3 for converter 5. The duration of a write or read cycle of memory 3 is, at most, one half-bit cycle.

The write address in memory 3 is supplied by a first 8-bit counter 7 incremented at the rate of bit clock HB (for example 2.048 MHz) and synchronized at the beginning of each multiplex frame. Counter 7 is not reset by frame synchronization signal FS but is initialized according to the time $\tau_e$ required for the paralleling by converter 4. The initialization value is selected so that, when counter 7 is at zero, the eight bits present at data input $D_I$ of memory 3 correspond to the first time slot $ITS_0$ of the first incoming multiplex at input junction $JE_0$. This time generally corresponds, in practice, to eight bit cycles.

The read address of memory 3 is supplied by memory 2. In other words, the data words at the output $D_O$ of memory 2 constitute the read addresses of memory 3. The duration of a write or read cycle of memory 2 is, as for memory 3, at most one half-bit cycle. The addressing of memory 2 is performed by identifying the outgoing time slots $OTS_j$. In other words, the 8-bit address includes the number j of the outgoing time slot $OTS_j$ on five most significant bits and the number l of output junction $JS_l$ on three least significant bits.

The address input A of memory 2 is connected to the output of a second two-input multiplexer 8. A first input receives an address issued by a microprocessor $\mu P$ (not shown) and a second input receives an address issued by a second counter 9 over eight bits.

The selection of the input of multiplexer 8 is performed by the microprocessor to enable it, at the beginning of a new communication, to indicate the path of this communication. At the beginning of each new communication, the microprocessor addresses memory 2 according to the subscriber who is the receiver and writes into this memory the address of the sending subscriber. For a bidirectional communication, the microprocessor must perform two write cycles at the beginning of each new communication.

The reading of memory 2 is cyclic. It is performed according to the addresses of the receiver subscribers, that is, according to the time slots $OTS_j$ of the outgoing multiplexes, by means of counter 9. This counter 9 is, like counter 7, incremented by bit clock HB and synchronized at each frame start. Like counter 7, counter 9 is not reset by frame synchronization signal FS. It is initialized according to the time $\tau_s$ required for the serializing by converter 5, which generally corresponds, in practice, to eight bit cycles. The initialization value is selected such that, when counter 9 is at zero, the bit present on each output junction $JS_0$ to $JS_7$ corresponds to the first bit of the first time slot $ITS_0$ of each incoming multiplex.

Since memories 2 and 3 are read at the rate of bit clock HB, counters 7 and 9 are actually phase shifted by seventeen bit cycles (eight bit cycles for each converter and one bit cycle for memory 3). This phase shift corresponds to the minimum propagation duration through matrix 1, counter 9 being in phase advance with respect to counter 7. The incoming and outgoing multiplexes are thus synchronized on the same frame synchronization signal FS.

For clarity, not all the signals and clock links have been shown. Particularly, converters 4 and 5 also operate at the rate of bit clock HB.

Even though such a matrix enables a strict contentionless operation for transmissions with a rate not exceeding 64 Kbits/s, it cannot be used for multiplex frames wherein several time slots TS are assigned to a same transmission channel.

Indeed, as soon as a transmission has to occupy several time slots TS of a multiplex, for example two for a transmission at 128 Kbits/s, such a matrix cannot respect the integrity of the sequence of the transmission while being strictly contentionless.

Actually, since counters 7 and 9 are phase shifted by seventeen bit cycles, the integrity of the sequences can only be respected if the microprocessor ensures that the time slots $OTS_j$ of an output junction $JS_l$ assigned to a given transmission channel are distant by at least three time slots TS from the time slots $ITS_i$ constituting the transmission channel on input junction $JE_k$. The microprocessor further has to ensure that the time slots, respectively $ITS_i$ and $OTS_j$, are in the same order at the input and output junctions $JE_k$ and $JS_l$, respectively. Matrix 1 is then no longer strictly contentionless.

Figure 3:
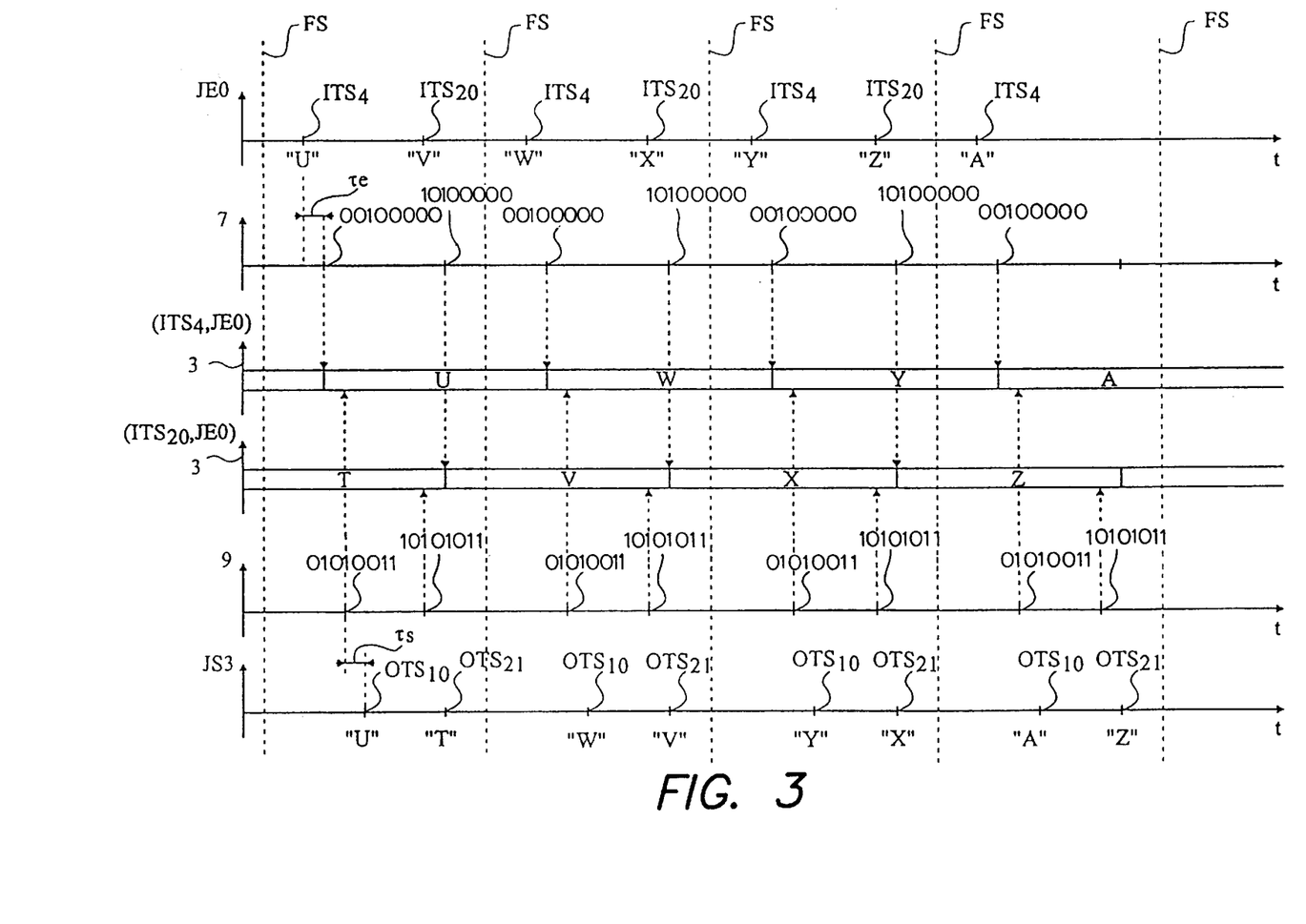

FIG. 3 illustrates an example of unidirectional communication from a subscriber M to a subscriber N over a channel at 128 Kbits/s, constituted by two time slots TS of a same multiplex.

Subscriber M is, for example, assigned time slots $ITS_4$ and $ITS_{20}$ of input junction $JE_0$ and subscriber N is, for example, assigned time slots $OTS_{10}$ and $OTS_{21}$ of output junction $JS_3$.

FIG. 3 shows, in the form of timing diagrams, the states of counters 7 and 9, the contents of the incoming and outgoing time slots, respectively $ITS_4$ and $ITS_{20}$, and $OTS_{10}$ and $OTS_{21}$, assigned to this communication on input and output junctions $JE_0$ and $JS_3$, respectively, and the addresses ($ITS_4$, $JE_0$) and ($ITS_{20}$, $JE_0$) of memory 3. The write and read times of memory 3 have been shown by arrows in dotted lines.

For clarity, the timing diagrams of FIG. 3 are not to scale and the half-bit cycle shift between the write and read cycles occurring in a same bit cycle has not been shown.

Since the minimum time of propagation across matrix 1 is seventeen bit cycles, all the 8-bit words contained in the time slots $ITS_{20}$ of junction $JE_0$ are transferred into the time slots $OTS_{21}$ of junction $JS_3$, but with a delay of one frame with respect to the words contained in the time slots $ITS_4$ of junction $JE_0$ which are transferred into the time slots $OTS_{10}$ of junction $JS_3$.

A message transmitted by subscriber M for example in a sequence UVWXYZ, where each letter stands for an 8-bit word and assuming that this message constitutes a whole sequence preceded by a word "T" and followed by a word "A", will become, on output junction $JS_3$, UTWVYXAZ.

Indeed, the writing of the words "U", "W" and "Y" is performed in three successive frames at the address ($ITS_4$, $JE_0$) of memory 3, upon the appearance of count 00100 000 ($ITS_4$, $JE_0$) in counter 7. The writing of the words "V", "X" and "z" is performed, in three successive frames at the address ($ITS_{20}$, $JE_0$) of memory 3, upon the appearance of count 10100 000 ($ITS_{20}$, $JE_0$) in counter 7.

The reading of each word "U", "W" and "Y" is performed, during the frame wherein it has been written, upon the appearance of count 01010 011 ($OTS_{10}$, $JS_3$) in counter 9 which addresses memory 2 so that it issues the read address 00100 000 ($ITS_4$, $JE_0$) of memory 3.

Conversely, the reading of each word "V", "X" and "Z" is performed, during the frame which follows that wherein it has been written, upon the appearance of count 10101 011 ($OTS_{21}$, $JS_3$) in counter 9 which addresses memory 2 so that it issues the read address 10100 000 ($ITS_{20}$, $JE_0$) of memory 3. Indeed, the seventeen bit cycle advance of counter 9 with respect to counter 7 results in count 10101 011 appearing in counter 9 before count 10100 000 appears in counter 7.

The offset between time slots $ITS_4$ and $ITS_{20}$ of input junction $JE_0$ and the counts, respectively 00100 000 and 10100 000 in counter 7, corresponds to the time $\tau_e$ for paralleling the data by converter 4. Similarly, the offset between the appearance of counts 01010 011 and 10101 011 in counter 9 and the time slots, respectively $OTS_{10}$ and $OTS_{21}$ of junction $JS_3$, corresponds to the time $\tau_s$ for serializing the data by converter 5.

SUMMARY OF THE INVENTION

According to a first aspect, the present invention provides a strictly contentionless switch matrix while preserving the integrity of the sequences of the multiplex wherein several time slots can be assigned to a same transmission channel.

The present invention also provides a switch matrix with an operation which is likely to be parametered according to whether the transmission channel includes a single time slot TS per frame of a multiplex or includes several time slots TS of a same multiplex.

The present invention also provides an implementation of such a switch matrix with a minimum number of required components.

The present invention also provides a switch matrix wherein the microprocessor acts only once to define the two paths of a bidirectional transmission.

The present invention also provides an implementation of such a switch matrix without it being necessary to use additional clock signals, nor memories faster than those which are used in matrices operating for channels at 64 Kbits/s only.

According to a second aspect, the invention provides a switch matrix which enables the establishment of a bidirectional communication path between two subscribers separated by at least two switch matrices to be easily checked.

The present invention also enables such a checking to be performed without using the microprocessor during the checking.

The present invention further enables such a checking from one of the two matrices and independently from the constitution of other switch matrices possibly included on the path to test between the two matrices.

The invention, achieves these objects by a matrix for switching between an input and an output group of at least two time-division multiplexes, including three buffers for storing data arriving in multiplex at input junctions to issue these data in multiplex on output junctions according to an assignment of each time slot of an input multiplex to a time slot of an output multiplex, a first of said buffers being provided for receiving the data relative to the transmissions as they are issued by a series-to-parallel converter receiving the input junctions and for enabling, at least when the data belong to a transmission channel including several time slots of a same multiplex, to transfer data to one of the two other buffers, wherein the three buffers are joined within a same memory, the selection of a buffer being performed by the two most significant bits of the read or write address of the memory.

The invention also achieves the above objects by a matrix for switching between an input and an output group of at least two time-division multiplexes, including three buffers for storing data arriving in multiplex at input junctions to issue these data in multiplex on output junctions according to an assignment of each time slot of an input multiplex to a time slot of an output multiplex, a first of said buffers being provided for receiving the data relative to the transmissions as they are issued by a series-to-parallel converter receiving the input junctions and for enabling, at least when the data belong to a transmission channel including several time slots of a same multiplex, to transfer data to one of the two other buffers; and an assignment memory, programmable by a microprocessor and which stores, for each outgoing time slot to be sent to one of the output junctions via a parallel-to-series converter, in addition to the address of an incoming time slot associated therewith and which is stored at the address of the outgoing time slot, an additional bit, the state of which differentiates a transmission channel including a single time slot from a transmission channel including several time slots of a same multiplex, wherein a data word associated with a transmission channel including a single time slot per multiplex frame is read, from the first buffer, at the address issued by the assignment memory to be directly sent to the parallel-to-series converter.

These objects, features and advantages, as well as others, of the present invention will be discussed in detail in the following description of a specific embodiment, taken in conjunction with the following drawings, but not limited by them.

DETAILED DESCRIPTION

Figure 5:
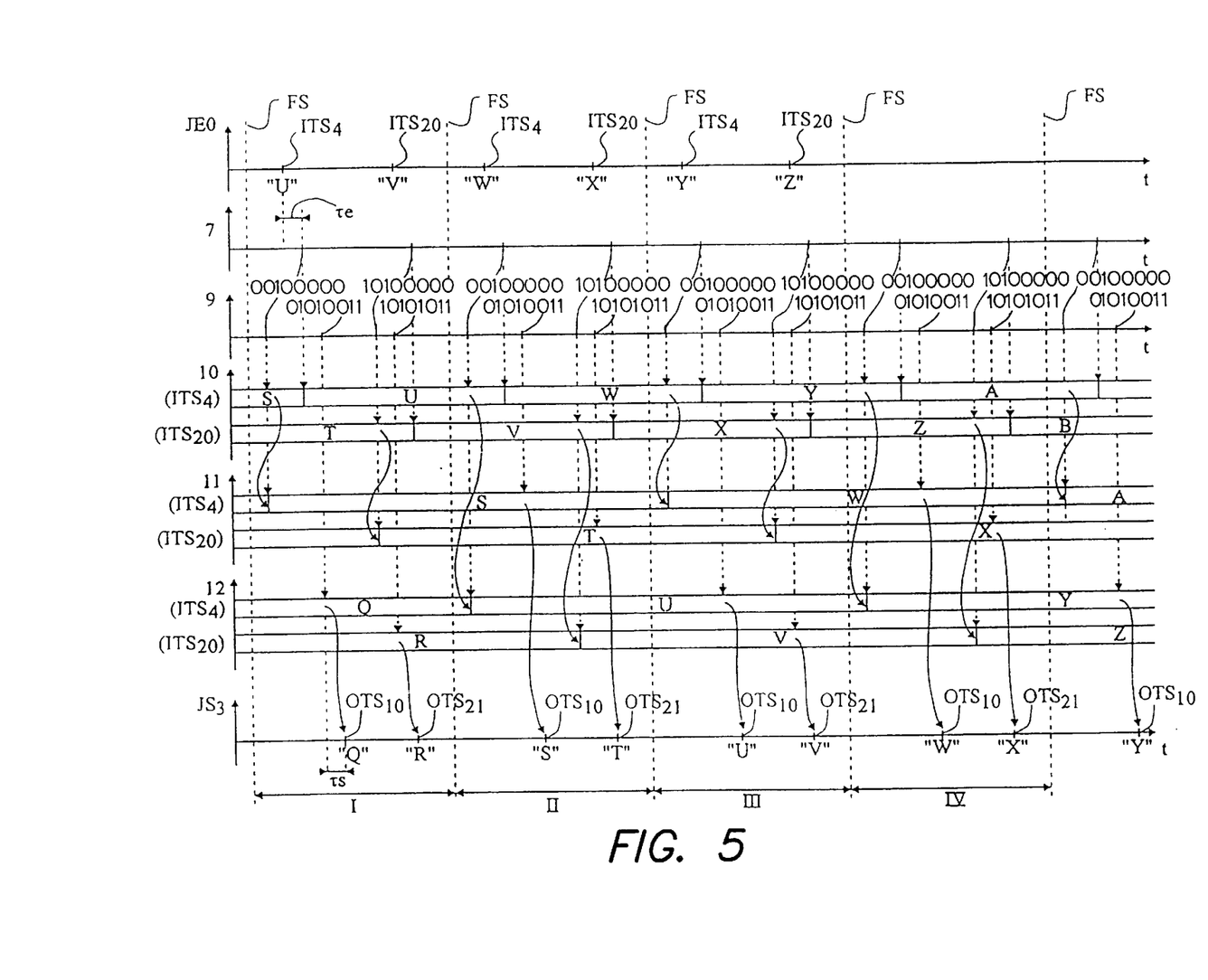
FIG. 5 illustrates, in the form of a timing diagram, the operation of a switch matrix such as shown in FIG. 4.
Figure 7:
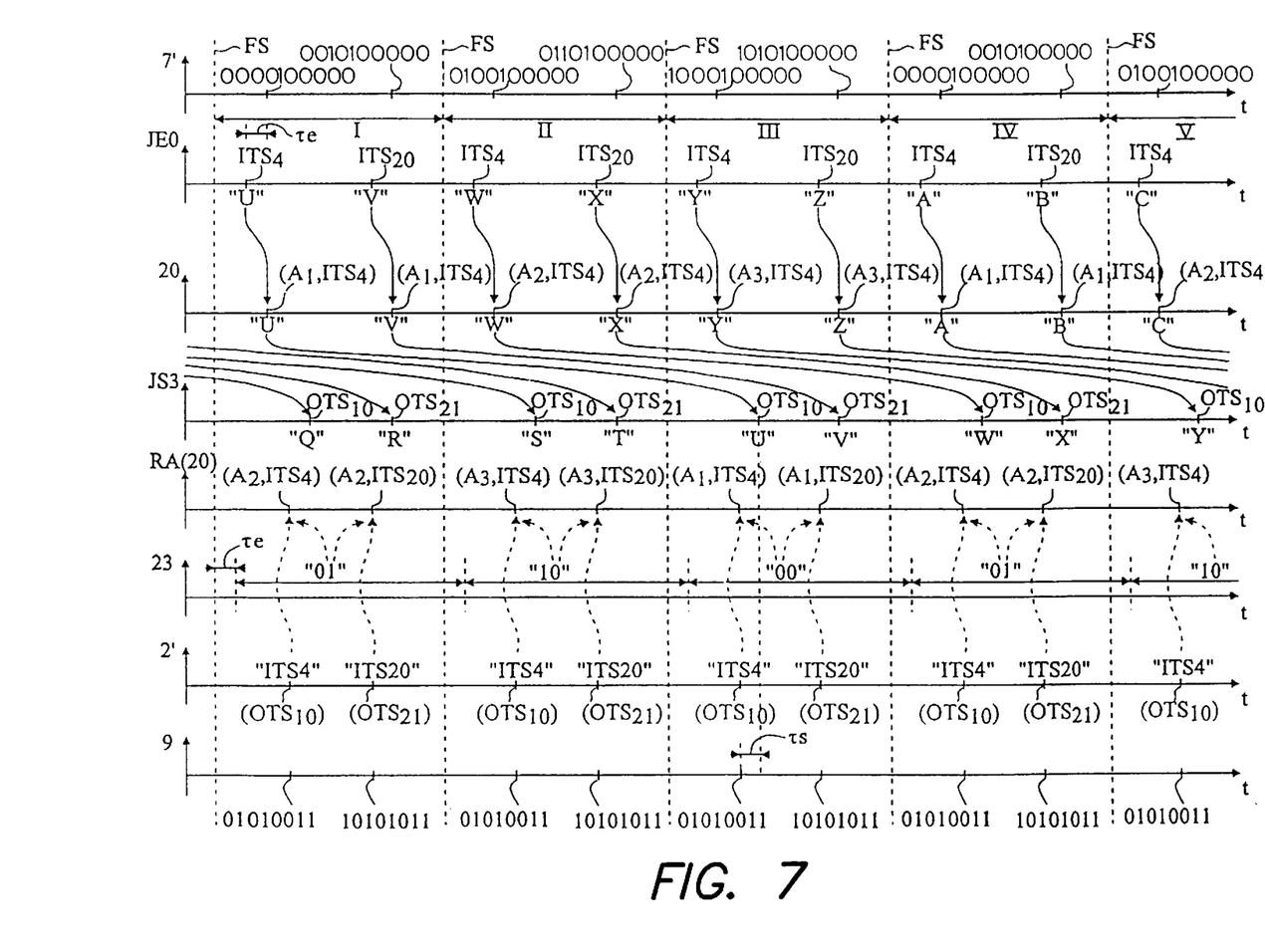
FIG. 7 illustrates, in the form of a timing diagram, the operation of a switch matrix such as shown in FIG. 6.

For clarity, only the elements and connections necessary to the understanding of the invention have been shown. For the same reasons, the timing diagrams of FIGS. 5 and 7 are not to scale and same elements have been referred to by same reference numbers in the different drawings.

Figure 4:
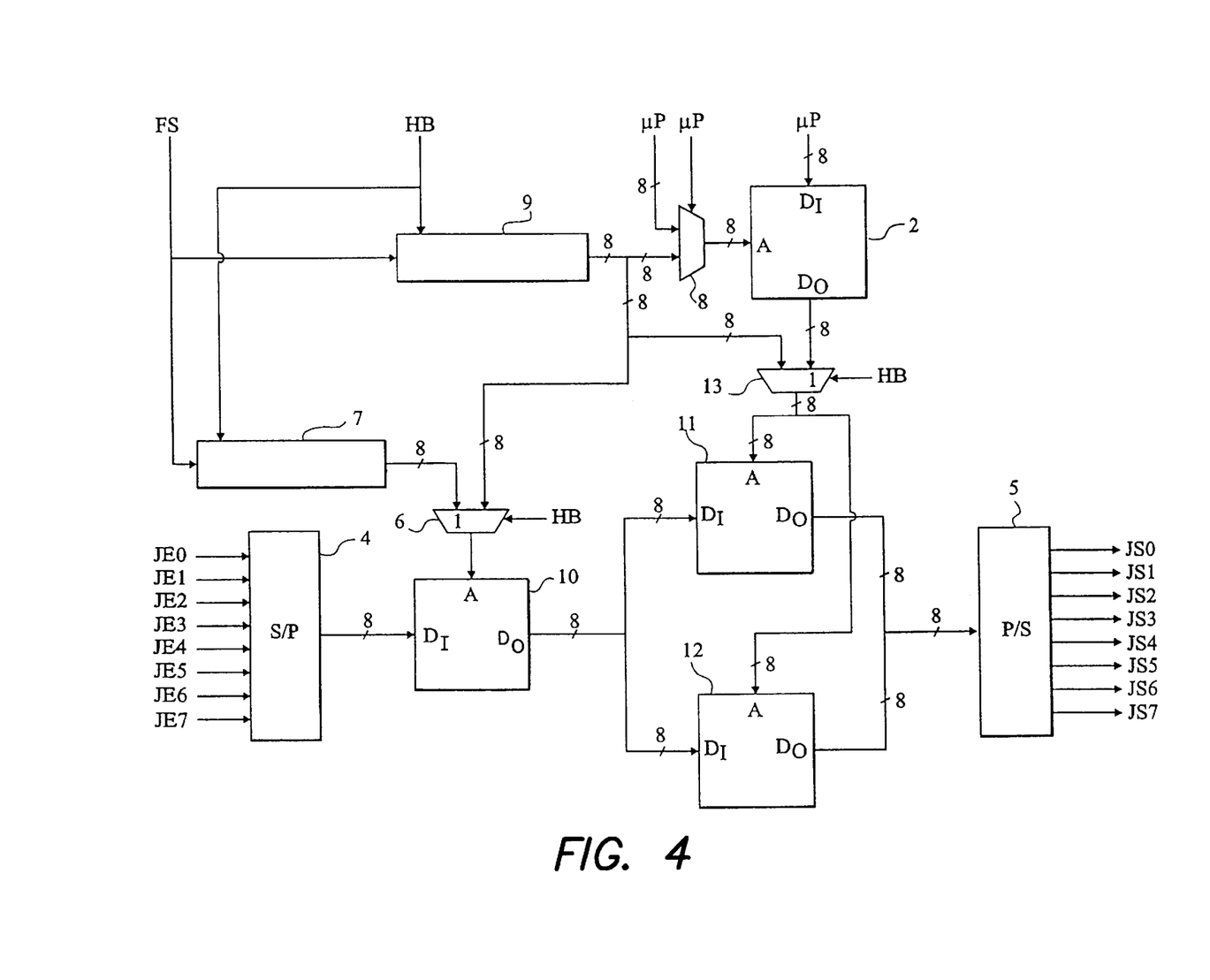
FIG. 4 shows, in the form of a block diagram, a first embodiment of a switch matrix according to a first aspect of the present invention.

FIG. 4 illustrates a simplified diagram of a first embodiment of a switch matrix applied to two groups of eight time-division multiplexes of thirty-two time slots TS, each including eight bits.

A feature of the present invention is the organizing of the storage of the data relative to the transmissions, no longer in one memory of 256 8-bit words, but in three memories 10, 11 and 12 of 256 8-bit words, or three areas of one memory.

A matrix such as shown in FIG. 4 includes, as formerly, a series-to-parallel converter 4, a parallel-to-series converter 5, a memory 2 for assigning the incoming time slots $ITS_i$ to outgoing time slots $OTS_j$, two counters 7 and 9 and two multiplexers 6 and 8. A first multiplexer 6 and a first counter 7 are associated with a first memory 10.

Memory 10 receives the data issued by series-to-parallel converter 4, the inputs of which correspond to the input junctions $JE_0$ to $JE_7$ of the matrix. The duration of a write or read cycle of memory 10 is, at most, one half-bit cycle.

Memory 10 is addressed, in write mode, at each first half-bit cycle by counter 7 and, in read mode, at each second half-bit cycle by counter 9. The selection between the read and write addresses is performed by means of multiplexer 6 which can be controlled by bit clock signal HB.

Counter 7 is an 8-bit counter incremented by bit clock HB and synchronized with a frame synchronization signal FS. Its initialization at each frame start is, as formerly, a function of the time $\tau_e$ required for the data paralleling by converter 4. The initialization value is selected so that the switching to zero of counter 7 corresponds, at the data input $D_I$ of memory 10, to the arrival of the first time slot $ITS_0$ of the incoming multiplex at junction $JE_0$.

Memory 10 operates as a synchronizing memory for two other memories 11 and 12. The switching itself happens, according to the invention and at least for transmission channels including several time slots TS of a same multiplex, from these memories 11 and 12.

Memories 11 and 12 receive their data from memory 10 and issue these data to parallel-to-series converter 5. Memories 11 and 12 are meant to contain the data relative to each time slot TS, every second frame.

In other words, the data read from memory 10 as coming from the incoming multiplexes are written into one memory, for example 11, during the even frames and into one memory, for example 12, during the odd frames. Similarly, these data are read to be issued to the outgoing multiplexes, from memory 11 or from memory 12, according to the parity of the frame to be issued. The data relative to one frame are written into one of memories 11 or 12 while the data relative to the other frame are read from the other memory 12 or 11.

Memories 11 and 12 are write addressed by counter 9. In other words, when a word is read from memory 10, this word is written at the same address in the memory 11 or 12 which constitutes the write memory during the current frame.

In read mode, memories 11 and 12 are addressed by a word contained in memory 2 and standing for the address of the time slot $ITS_i$ of the input junction $JE_k$ with which the outgoing time slot $OTS_j$ on junction $JS_l$ is associated.

A third two-input multiplexer 13 is used to select, for each half-bit cycle, the read or write address of the memories, for example 11 and 12 respectively, between the word read from memory 2 and the result of counter 9. The duration of a write or read cycle of memories 11 and 12 is, at most, one half-bit cycle.

For each first half-bit cycle, multiplexer 13 selects the address read from memory 2 for the reading of the memory 11 or 12 which is used to generate the outgoing multiplexes of the current frame.

For each second half-bit cycle, multiplexer 13 selects the address issued by counter 9 to enable the writing, in the other one of memories 11 and 12, of the word read from memory 10 at the same address.

The control input of multiplexer 13 can thus receive bit clock HB, like multiplexer 6.

Memory 2 is, as formerly, associated with counter 9 and multiplexer 8 and its operation is similar to that described in relation with FIG. 2.

The writing of the addresses of the time slots $ITS_i$ of the incoming multiplexes is performed, for each new communication, by a microprocessor μP (not shown). This microprocessor controls multiplexer 8 and also supplies the address of the time slot $OTS_j$ of the outgoing multiplex with which the address of the time slot $ITS_i$ of the incoming multiplex is to be associated.

According to the invention, the writing of a bidirectional path into memory 2 for assigning the time slots TS is performed by means of a single datum and a single address issued by the microprocessor.

For this purpose, the microprocessor which issues two 8-bit words for memory 2 (the write address and the data to be written at this address) sends an additional bit BID set at "1" in case of a bidirectional transmission. When this bit BID is at state "1", two write cycles into memory 2 are generated. The two words sent by the microprocessor constitute, in a first cycle, respectively the address and the data and, in a second cycle, respectively the data and the address.

Operating time is thus saved for the microprocessor, which only once sends words for defining a bidirectional transmission.

The means (not shown) likely to be used to realize, in the presence of state "1" of bit BID, the exchange of the data with the address issued by the microprocessor, are for example two 2-input multiplexers, each receiving the two words issued by the microprocessor. The outputs of these multiplexers are respectively connected to the address and data inputs A and D of memory 2. When bit BID is at state "0", only a first input of each multiplexer is selected. When bit BID is at state "1", this first input is selected during a first bit cycle, while the second input is selected during the following bit cycle.

The read addresses of memory 2 are issued by counter 9. Counter 9 is incremented by bit clock HB and synchronized by frame synchronization signal FS. Preferably, counter 9 is a 9-bit counter. The eight least significant bits are set for each frame start at a value chosen so that the frames which are issued by parallel-to-series converter 5 counter 5 are synchronous with the frames which arrive to the matrix. This value depends especially on the time $\tau_S$ required for the data serialization by converter 5. The duration of a write or read cycle of memory 2 is, at most, one half-bit cycle. The ninth most significant bit is, according to the invention, used to control memories 11 and 12 in read or write mode.

The control (not shown) in read or write mode of memories 11 and 12, and thus the selection of which memory 11 or 12 is in read mode, and which is in write mode, is performed by means of the ninth bit of counter 9. According to the invention, this ninth most significant bit which is not reset by signal FS, is used to indicate arbitrarily the memory which is in write mode. The use of this ninth bit has the advantage of avoiding to use a multiplexer at the data input of memories 11 and 12.

The read and write controls of the different memories have not been shown. Their implementation by conventional means is within the abilities of those skilled in the art according to the functional indications given hereinabove.

Counters 7 and 9 are, as formerly, phase shifted by seventeen bit cycles which correspond to the eight bit cycles latency of each converter 4 and 5 and to the one bit cycle latency of memory 10.

Since the data read from memory 10 are now electrically synchronous with the data read from memories 11 and 12, the addressing of memories 11 and 12 is performed, for reading as well as for writing, according to the result of counter 9. The result of counter 9 is used directly for writing while it is used via memory 2 for reading.

An advantage of the use of two memories 11 and 12 is that the integrity of the sequences contained in channels of the multiplexes is respected, even if these channels include several time slots TS and this while offering a strictly contentionless matrix.

Therefore, using again the preceding example of a message UVWXYZ transmitted on a channel at 128 Kbits/s including the time slots $ITS_4$ and $ITS_{20}$ of an incoming multiplex at junction $JE_0$ and to be issued on the time slots $OTS_{10}$ and $OTS_{21}$ of an outgoing multiplex at junction $JS_3$, the integrity of the sequence of this message is respected.

FIG. 5 shows, in the form of a timing diagram, the states of counters 7 and 9, the contents of incoming and outgoing time slots, respectively $ITS_4$, $ITS_{20}$ and $OTS_{10}$, $OTS_{21}$, assigned to this transmission at the input and output junctions, respectively $JE_0$ and $JS_3$, and the contents of the addresses ($ITS_4$, $JE_0$) and ($ITS_{20}$, $JE_0$) of memories 10, 11 and 12. The write and read times of memories 10, 11 and 12 have been shown by arrows in dotted lines.

For clarity, the timing diagram of FIG. 5 is not to scale and the spacing of one half-bit cycle between the read and write cycles happening on a same bit has not been shown.

It is assumed that, in a first frame I where the words "U" and "V" are present in time slots $ITS_4$ and $ITS_{20}$ of input junction $JE_0$, memory 11 is the write memory, memory 12 being the read memory. It is also assumed that the words "U" and "Z" are, respectively, the first and last words of the sequence considered, this sequence being included between words designated by "Q", "R", "S", "T" upstream and "A" and "B" downstream.

The first address likely to relate to the sequence taken as an example is issued by counter 9. Indeed, counter 9 has an advance of seventeen bit cycles with respect to counter 7.

When counter 9 issues the address 00100 000 ($ITS_4$, $JE_0$), no word of the considered sequence is present in memory 10 yet. The word written into memory 11 at this address corresponds to the word "S" contained in memory 10 at the same address.

When counter 7 issues the address 00100 000 ($ITS_4$, $JE_0$), the word "U" is written into memory 10 at this address. The offset between time slot $ITS_4$ of input junction $JE_0$ and count 00100 000 on counter 7 corresponds to the data paralleling time $\tau_e$ of converter 4.

When counter 9 issues the address 01010 011 ($OTS_{10}$, $JS_3$), no word of sequence UVWXYZ is contained in memory 12 at the address 00100 000 ($ITS_4$, $JE_0$) yet. The time slot $OTS_{10}$ transmitted on output junction $JS_3$ thus contains the word "Q" contained in memory 12 at the address 00100 000 ($ITS_4$, $JE_0$). The offset between the appearing of count 01010 011 on counter 9 and time slot $OTS_{10}$ of junction $JS_3$ corresponds to the data serialization time $\tau_s$ of converter 5.

When counter 9 issues the address 10100 000 ($ITS_{20}$, $JE_0$), the word "V" is not present in memory 10 yet. Indeed, since counter 9 has an advance of seventeen bit cycles to respect the synchronizing of the incoming and outgoing multiplexes, counter 7 has just written, in the first half-bit cycle, a word at the address 10011 110 ($ITS_{19}$, $JE_6$) in memory 10. The word "T" written into memory 11 at the address 10100 000 ($ITS_{20}$, $JE_0$) corresponds to the word "T" contained in memory 10 at this address.

When counter 9 issues the address 10101 011 ($OTS_{21}$, $JS_3$), the time slot $OTS_{21}$ of junction $JS_3$ of the first frame I contains the word "R" contained in memory 12 at the address 10100 000 ($ITS_{20}$, $JE_0$).

When counter 7 issues the address 10100 000 ($ITS_{20}$, $JE_0$), the word "V" is written into memory 10 at this address.

At the beginning of a second frame II, memory 11 becomes the read memory and memory 12 becomes the write memory.

When counter 9 issues the address 00100 000 ($ITS_4$, $JE_0$), the word "U" is read from memory 10 at this address and written into memory 12 at the same address. When counter 7 issues the address 00100 000 ($ITS_4$, $JE_0$), the word "W" is written into memory 10 at this address. When counter 9 issues the address 01010 011 ($OTS_{10}$, $JS_3$), the word "S" corresponding to the word written in memory 11 at the address 00100 000 ($ITS_4$, $JE_0$) during the first frame I is read from this memory 11. The time slot $OTS_{10}$ transmitted on output junction $JS_3$ thus contains the word "S". When counter 9 issues the address 10100 000 ($ITS_{20}$, $JE_0$), the word "V" is read from memory 10 at this address and written into memory 12 at the same address. When counter 9 issues the address 10101 011 ($OTS_{21}$, $JS_3$), the word "T" is read from memory 11 at the address ($ITS_{20}$, $JE_0$). The time slot $OTS_{21}$ transmitted on junction $JS_3$ during this second frame II thus contains the word "T". When counter 7 issues the address 10100 000 ($ITS_{20}$, $JE_0$), the word "X" is written into memory 10 at this address.

At the beginning of a third frame III, memory 12 becomes the read memory again and memory 11 becomes the write memory again.

When counter 9 issues the address 00100 000 ($ITS_4$, $JE_0$), the word "W" is read from memory 10 at this address and written into memory 11 at the same address. When counter 7 issues the address 00100 000 ($ITS_4$, $JE_0$), the word "Y" is written into memory 10 at this address. When counter 9 issues the address 01010 011 ($OTS_{10}$, $JS_3$), the word "U" is read from memory 12 at the address 00100 000 ($ITS_4$, $JE_0$) issued by memory 2. The word "U" is sent to parallel-to-series converter 5 to be transmitted, in time slot $OTS_{10}$, on output junction $JS_3$. When counter 9 issues the address 10100 000 ($ITS_{20}$, $JE_0$), the word "X" is read from memory 10 at this address and written into memory 11 at the same address. When counter 9 issues the address 10101 011 ($OTS_{21}$, $JS_3$), the word "V" is read from memory 12 at the address 10100 000 ($ITS_{20}$, $JE_0$) issued by memory 2. The word "V" is sent to parallel-to-series converter 5 to be transmitted, in time slot $OTS_{21}$, on output junction $JS_3$. When counter 7 issues the address 10100 000 ($ITS_{20}$, $JE_0$), the word "Z" is written into memory 10 at this address.

At the beginning of a fourth frame IV, memory 11 becomes the read memory again and memory 12 becomes the write memory again.

When counter 9 issues the address 00100 000 ($ITS_4$, $JE_0$), the word "Y" is read from memory 10 at this address and written into memory 12 at the same address. Assuming that "Z" is the last word of the sequence, the word "A" is written, into memory 10 and at the address 00100 000 ($ITS_4$, $JE_0$), when counter 7 issues this address. The word "B" is written into memory 10 when counter 7 issues the address 10100 000 ($ITS_{20}$, $JE_0$) of this fourth frame IV. When counter 9 issues the address 01010 011 ($OTS_{10}$, $JS_3$), the word "W" is read from memory 11 at the address 00100 000 ($ITS_4$, $JE_0$) issued by memory 2. The word "W" is sent to parallel-to-series converter 5 to be transmitted, in time slot $OTS_{10}$, onto output junction $JS_3$. When counter 9 issues the address 10100 000 ($ITS_{20}$, $JE_0$), the word "Z" is read from memory 10 at this address and written into memory 12 at the same address. When counter 9 issues the address 10101 011 ($OTS_{21}$, $JS_3$), the word "X" is read from memory 11 at the address 10100 000 ($ITS_{20}$, $JE_0$) issued by memory 2. The word "X" is sent to parallel-to-series converter 5 to be transmitted, in time slot $OTS_{21}$, onto output junction $JS_3$.

This operation goes on and the words "Y" and "Z" are transmitted in time slots $OTS_{10}$ and $OTS_{21}$, respectively, onto junction $JS_3$ during a fifth frame. As shown by this example, the integrity of the sequence is respected.

The switch matrix according to this first embodiment introduces a fixed delay of one frame during the propagation through the matrix. Thus, according to the respective locations of the associated incoming and outgoing time slots $ITS_i$ and $OTS_j$, the duration of the propagation through the matrix ranges, according to this first embodiment, is between 33 and 95 time slots TS. Therefore, if an incoming time slot $ITS_0$ is associated with an outgoing time slot $OTS_{31}$, the time separating an incoming word and this same word at the output of the matrix is 95 time slots TS. If an incoming time slot $ITS_{31}$ is associated with an outgoing time slot $OTS_0$, the time separating an incoming word and this same word at the output of the matrix is 33 time slots TS.

Figure 6:
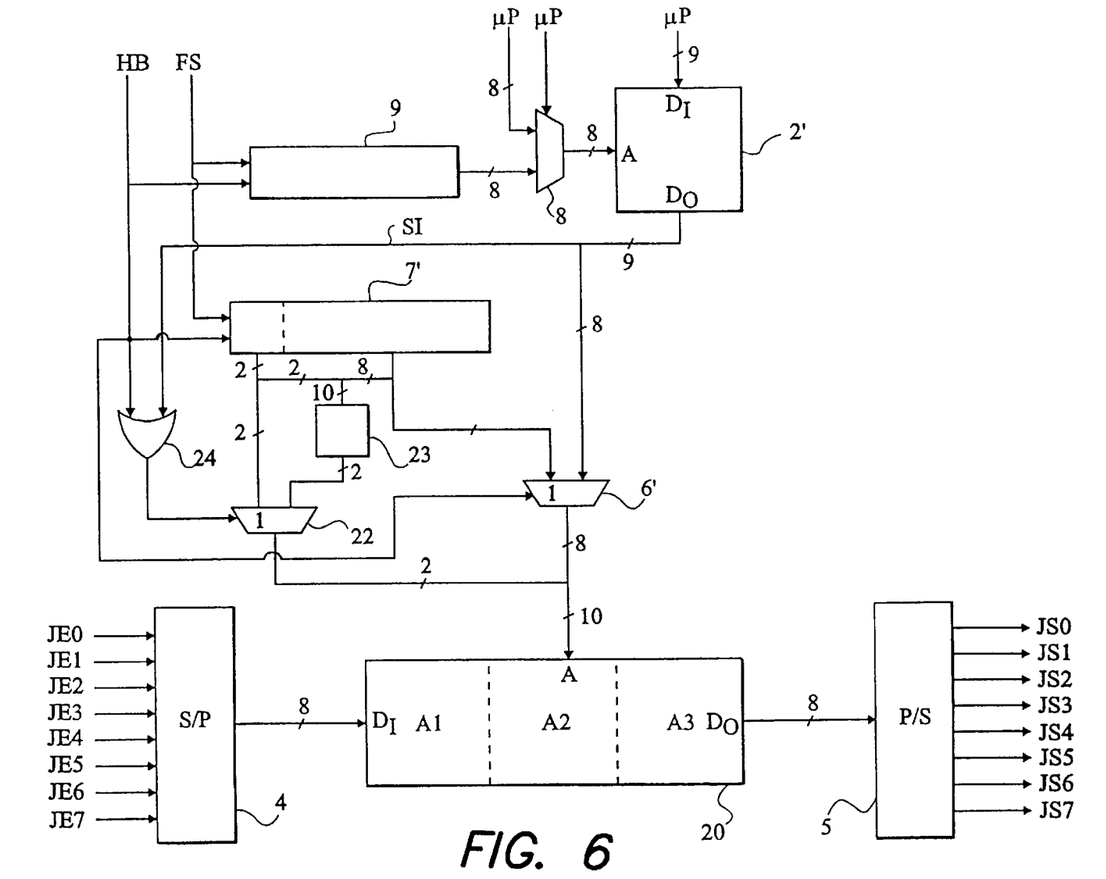
FIG. 6 shows, in the form of a block diagram, a second embodiment of a switch matrix according to the first aspect of the present invention.

FIG. 6 illustrates a second embodiment according to the first aspect of the present invention, wherein the three storage areas which are meant for containing the data of the transmissions are constituted by areas of a same memory 20. These areas are, according to the invention, contiguous from the viewpoint of the addresses.

Memory 20 is a memory of 768 8-bit words, with the duration of its read or write cycles corresponding to one half-bit cycle.

This memory is divided into three areas, respectively $A_1$, $A_2$ and $A_3$, of 256 8-bit words.

As formerly, a first counter 7' has the function of issuing to memory 20 a write address of a word issued by a series-to-parallel converter 4 receiving the input junctions $JE_0$ to $JE_7$ of the matrix.

Counter 7' here is a 10-bit counter, with its two most significant bits identifying the area $A_1$, $A_2$ or $A_3$ of memory 20 into which the words containing the data relative to the transmission are to be written. In other words, the writing into memory 20 is performed circularly by starting with a first area, for example $A_1$, which is overwritten every three frames of the multiplexes.

Counter 7' is, as formerly, incremented by bit clock HB and synchronized by signal FS for synchronizing the multiplex frames. The two most significant bits of counter 7' are parametered to count up to three. In other words, these two bits never go through state "11" but switch from state "10" to state "00". The eight least significant bits are reinitialized, at each frame start, according to the time $\tau_e$ required for the data paralleling by converter 4. The initialization value is selected so that the zeroing of the eight bits corresponds, at the data input $D_I$ of memory 20, to the arrival of the first time slot $ITS_0$ of the incoming multiplex on junction $JE_0$. The writing into memory 20 happens at each first half-bit cycle.

Again, as in the first embodiment, there is an assignment memory 2' associated with a multiplexer 8 and with a counter 9.

Counter 9 and multiplexer 8 are the same as those described in relation with FIG. 4. Counter 9 is still phase shifted by seventeen bit cycles with respect to counter 7'. The writing and reading of the memory for assigning the time slots TS are performed in the same way as in the first embodiment.

However, according to this embodiment, memory 2' for assigning the time slots TS is a memory of 256 9-bit words. A bit $S_I$, for example the most significant bit of each word set by the microprocessor, determines whether the output time slot $OTS_j$, the address of which is identified by the eight least significant bits, is associated with a transmission at 64 Kbits/s or at a higher rate. In other words, bit SI determines whether the integrity of the sequence is to be respected or not.

The reading from memory 20, to issue the data relative to the transmissions to a parallel-to-series converter 5, is performed for each second half-bit cycle. The eight least significant bits of the read address of memory 20 are issued by memory 2' according to the address issued thereto by counter 9.

The two most significant bits of the read address which enable to select the area $A_1$, $A_2$ or $A_3$ of memory 20 depend, preferably, on the state of the bit $S_I$ of the word read out from memory 2'.

If bit $S_I$ is at state "1" indicating, for example, that the time slot $OTS_j$ which is to be sent to an output junction $JS_j$ is assigned to a transmission at 64 Kbits/s, these two most significant bits correspond to the two most significant bits of counter 7'. In other words, when the problem of the integrity of the sequence does not arise for a given transmission, memory 20 is read from in the area where the incoming data are being written.

If bit $S_I$ is at state "0" indicating, for example, that several time slots TS of a same multiplex are assigned to a same transmission, memory 20 is read from in an area where it is stable, that is, which will not be altered during the reading of this area.

For this purpose, the eight least significant bits of the address input A of memory 20 come from a multiplexer 6'. A first input of this multiplexer 6' receives the eight least significant bits of counter 7' while a second input receives the eight bits issued by memory 2'. This multiplexer 6' is, like the multiplexer 6 of the first embodiment, controlled by signal HB to select the address between a write address and a read address.

The two most significant bits of the address input A of memory 20 are issued by a two-input multiplexer 22. A first input of this multiplexer 22 receives the two most significant bits of counter 7'. This input is selected for the cyclic writing into memory 20 and for the reading from this memory 20 if bit $S_I$ is at state "1". A second input of multiplexer 22 receives the two bits generated by an operator 23. The function of operator 23 is to indicate the area of memory 20 which is stable. Operator 23 must take into account the seventeen bit cycle phase shift between counters 7' and 9 which leads to the fact that, during the complete reading of a given area, the writing is actually performed in two areas. Operator 23 receives the ten bits of counter 7' to generate the two most significant bits identifying the stable area. The practical implementation of operator 23 is within the abilities of those skilled in the art according to the functional indications given hereinabove. The second input of multiplexer 22 is selected for the reading of memory 20 if bit $S_I$ is at state "0".

The selection input of multiplexer 22 can, for example, come from a logic combination between bit clock signal HB and the bit $S_I$ issued by memory 2'. As an example, an OR combination 24 between bit clock HB and bit $S_I$ has been shown in FIG. 6. Of course, the choice of the logic combination depends on the meaning of the states of bit $S_I$ and can be modified accordingly.

FIG. 7 illustrates, using once again the example of transmission of FIG. 5, the operation of a matrix implemented according to this second embodiment. FIG. 7 shows, in the form of a timing diagram, the states of counters 7' and 9, the contents of the time slots assigned to this transmission at the input and output junctions $JE_0$ and $JS_3$, the contents of the words read from memory 2', the state of the bits generated by operator 23 and the read addresses RA(20) of memory 20. The data have been indicated between quotation marks "" and the write or read addresses of memories 2' and 20 have been indicated in parenthesis ( ). The progressions of the data words "U", "V", "W", "X", "Y" and "Z" have been shown by full arrows and the progressions of the data words meant to constitute the read addresses of memory 20 have been shown by arrows in dotted lines.

For clarity, the timing diagram of FIG. 7 is not to scale and the spacing of one half-bit cycle between the write and read cycles happening in a same bit cycle has not been shown. Similarly, the addresses have been shown without indicating the junctions to which they refer, since time slots $ITS_4$ and $ITS_{20}$ always refer to input junction $JE_0$ and time slots $OTS_{10}$ and $OTS_{21}$ always refer to output junction $JS_0$.

Since the example refers to a communication at a rate of 128 Kbits/s, the bits $S_I$ associated with the addresses of the incoming time slots $ITS_4$ and $ITS_{20}$ at junction $JE_0$ and contained within memory 2' are at state "0". In other words, memory 2' contains, at the address 01010 011 ($OTS_{10}$, $JS_3$), the word 0 00100 000 ($S_I$, $ITS_4$, $JE_0$) and, at the address 10101 011 ($OTS_{21}$, $JS_3$), the word 0 10100 000 ($S_I$, $ITS_{20}$, $JE_0$). Since all the bits $S_I$ relative to the transmission taken as an example are at state "0", they have not been indicated in FIG. 7.

The first address relating to the transmission taken as an example is here issued by counter 7'. A first frame I is considered, where the two most significant bits of counter 7' are at state "00" (area $A_1$ of memory 20). In fact, these two most significant bits switch to state "00" at the same time as the eight least significant bits of counter 7' switch to zero, that is, after the time $\tau_e$ which corresponds to the time required for the data paralleling by converter 4.

When counter 7' issues the address 00 00100 000 ($A_1$, $ITS_4$, $JE_0$), the word "U" is written into memory 20 at this address during the first half-bit cycle. Indeed, multiplexers 22 and 6' select their first respective inputs. As formerly, the offset between the time slot $ITS_4$ of input Junction $JE_0$ and the count 00 00100 000 on counter 7' corresponds to the time $\tau_e$ of data paralleling by converter 4.

When counter 9 issues the address 01010 111 ($OTS_{10}$, $JS_3$), the word 0 00100 000 ($S_I$, $ITS_4$, $JE_0$) is read from memory 2'. Since bit $S_I$ is at state "0" and the second half-bit cycle has been entered, multiplexer 22 selects its second input, that is, the output of operator 23, which here stands for "01", $A_2$ being the stable area. The second input of multiplexer 6' is also selected by the fact that the second half-bit cycle has been entered. The read address of memory 20 thus is 01 00100 000 ($A_2$, $ITS_4$, $JE_0$). No word of sequence UVWXYZ is contained at this address yet. The time slot $OTS_{10}$ transmitted on output junction $JS_3$ thus contains the word "Q". Similarly, when counter 9 issues the address 10101 011 ($OTS_{21}$, $JS_3$) during this first frame I, the time slot $OTS_{21}$ transmitted on output junction $JS_3$ contains the word "R".

When counter 7' issues the address 00 10100 000 ($A_1$, $ITS_{20}$, $JE_0$), the word "V" is written into memory 20 at this address. When counter 7' issues the address 01 00100 000 ($A_2$, $ITS_4$, $JE_0$), the word "W" is written into memory 20 at this address.

When counter 9 issues, again, the address 01010 111 ($OTS_{10}$, $JS_3$), the read address of memory 20 is 10 00100 00 ($A_3$, $ITS_4$, $JE_0$). No word of the message is contained at this address yet. The time slot $OTS_{10}$ transmitted on output junction $JS_3$, during a second frame II thus contains the word "S". Similarly, when counter 9 issues, during this second frame II, the address 10101 011 ($OTS_{21}$, $JS_3$), the time slot $OTS_{21}$ transmitted on output junction $JS_3$ contains the word "T".

When counter 7' issues the address 01 10100 000 ($A_2$, $ITS_{20}$, $JE_0$), the word "X" is written into memory 20 at this address. When counter 7' issues the address 10 00100 000 ($A_3$, $ITS_4$, $JE_0$), the word "Y" is written into memory 20 at this address.

When counter 9 issues, again, the address 01010 011 ($OTS_{10}$, $JS_3$), the read address of memory 20 is 00 00100 000 ($A_1$, $ITS_4$, $JE_0$). The word "U" is thus read from memory 20 and placed in the time slot $OTS_{10}$ of a third frame III, on output junction $JS_3$. As formerly, the offset between the appearing of count 01010 011 on counter 9 and the time slot $OTS_{10}$ of junction $JS_3$ corresponds to the data serialization time $\tau_S$ of converter 5. When counter 9 issues, again, the address 10101 011 ($OTS_{21}$, $JS_3$), the read address of memory 20 is 00 10100 000 ($A_1$, $ITS_{20}$, $JE_0$). The word "V" is thus read from memory 20 and placed in the time slot $OTS_{21}$ of the third frame III, on output junction $JS_3$.

When counter 7' issues the address 10 10100 000 ($A_3$, $ITS_{20}$, $JE_0$), the word "Z" is written into memory 20 at this address. When counter 7' issues, again and after resetting its two most significant bits, the address 00 00100 000 ($A_1$, $ITS_4$, $JE_0$), the empty word "A" is written into memory 20 at this address. The words "B" and "C" will be written into memory 20 when counter 7' issues, again and respectively, the addresses 00 10100 000 ($A_1$, $ITS_{20}$, $JE_0$) and 01 00100 000 ($A_2$, $ITS_4$, $JE_0$).

When counter 9 reissues the address 01010 011 ($OTS_{10}$, $JS_3$), the read address of memory 20 is, again, 01 00100 000 ($A_2$, $ITS_4$, $JE_0$). The word "W" is thus read from memory 20 and placed in the time slot $OTS_{10}$ of a fourth frame IV, on output junction $JS_3$. When counter 9 reissues the address 10101 011 ($OTS_{21}$, $JS_3$), the read address of memory 20 is, again, 01 10100 000 ($A_2$, $ITS_{20}$, $JE_0$). The word "X" is thus read from memory 20 and placed in the time slot $OTS_{21}$ of the fourth frame IV, on output junction $JS_3$. When counter 9 reissues the address 01010 011 ($OTS_{10}$, $JS_3$), the read address of memory 20 is, again, 10 00100 000 ($A_3$, $ITS_4$, $JE_0$). The word "Y" is thus read from memory 20 and placed in the time slot $OTS_{10}$ of a fifth frame, on output junction $JS_3$.

Finally, when counter 9 reissues the address 10101 011 ($OTS_{21}$, $JS_3$), the read address of memory 20 is, again, 10 10100 000 ($A_3$, $ITS_{20}$, $JE_0$). The word "Z" is thus read from memory 20 and placed in the time slot $OTS_{21}$ of the fifth frame V, on output junction $JS_3$.

It should thus be noted that, as in the first embodiment, the integrity of sequence UVWXYZ is respected. In this example, the matrix introduces a fixed delay of one frame, independently from the respective locations of the incoming and outgoing time slots $ITS_i$ and $OTS_j$ associated therewith.

Although the use of bit $S_I$ has been described in relation with the second embodiment, the same functionality can be obtained with the first embodiment.

For this purpose, multiplexer 6 (FIG. 4) is replaced by a three-input multiplexer. The third input receives the address issued by assignment memory 2. This assignment memory becomes a memory of nine-bit words. The memory 10 can thus be read addressed by identifying the incoming time slot $ITS_i$ which is associated with the outgoing time slot $OTS_j$, the address of which is issued by counter 9. An additional multiplexer is installed at the data output $D_O$ of memory 10 to enable, according to the state of bit $S_i$, the selection between an output towards memories 11 and 12 and a direct output towards converter 5.

An advantage of the second embodiment is that it does not require an additional multiplexer. Another advantage of using a single memory 20 to constitute the three storage areas is that the number of required memory controllers, in particular, is minimized.

An advantage of the invention, according to its first aspect described hereinabove is that it is able to choose whether the transmissions at 64 Kbits/s which raise no sequence integrity problem, are to be delayed by one frame or not. Therefore, by the use of bit $S_I$, the matrix according to the invention is likely to be parametered between two operating modes.

By positioning all the bits $S_I$ at state "0", the matrix can be made to introduce a fixed delay of one frame for all the transmissions, whatever their rate. In this case, the duration of the propagation through the matrix ranges, as in the first embodiment, between 33 and 95 time slots, according to the respective locations of the associated time slots $ITS_i$ and $OTS_j$.

It will be however preferred to set bit $S_I$ according to the transmission rate and have the matrix force this fixed delay of one frame only for the transmissions at a rate higher than 64 Kbits/s.

For transmissions at 64 Kbits/s, the propagation through the matrix then introduces a variable delay, ranging between 3 and 63 time slots TS, according to the respective positions, in the frame, of the associated incoming and outgoing time slots $ITS_i$ and $OTS_j$.

If the incoming and outgoing time slots $ITS_i$ and $OTS_j$ are distant by more than two time slots TS, j being higher than i, the propagation duration through the matrix is j−i time slots TS. This duration thus ranges between 3 and 31 time slots TS.

If the incoming and outgoing time slots $ITS_i$ and $OTS_j$ are distant by less than two time slots TS, j being higher than i, the propagation duration through the matrix is 32−j−i time slots TS. This duration thus ranges between 32 and 34 time slots TS.

If the outgoing time slot $OTS_j$ is before time slot $ITS_i$ in the multiplex frame, that is, if j is lower than i, the propagation duration through the matrix is 32−i+j time slots. This duration thus ranges between 33 and 63 time slots TS.

Memory 2 or 2' can, if necessary, contain other bits than bit $S_I$ to configure the matrix for each time slot TS and/or to indicate the type of data contained in a time slot TS. The size of the words of memory 2 or 2' is thus a function of the number of additional bits characterizing or defining the time slot and which are associated with the incoming time slots $ITS_i$ in addition to the eight bits which identify them.

This can be, for example, a bit which indicates whether the contents of a time slot TS of a transmission are to be read from the storage areas containing the data relative to the transmission or come from outside the matrix. That is, information relative to the transmissions (for example, information establishing the address of the receiver) is generally transmitted on the multiplex frames. This information has to be processed, for example by the microprocessor, and is not required to be stored in the storage areas of the matrix. In the presence of such information, the microprocessor writes, at the address of memory 2 or 2' which corresponds to this time slot, a bit which will be used to control a multiplexer (not shown) placed between the data output $D_O$ of memory 20 and converter 5. This multiplexer has, for example, two inputs, a first input receiving the data output $D_O$ of memory 20 while a second input receives a word from outside the matrix. The same type of selection can be reproduced, on the input side of the matrix, by means of the same bit or of another bit contained in memory 2 or 2'.

An advantage of the present invention, according to its first aspect, is that the multiplexers can all (except for multiplexer 8 which is, as formerly, controlled by the microprocessor) be controlled from bit clock signal HB without it being necessary to use other clock signals. For this purpose, the fact that signal HB has, for each bit cycle, two states with a duration of one half-bit cycle, is exploited.

Figure 8:
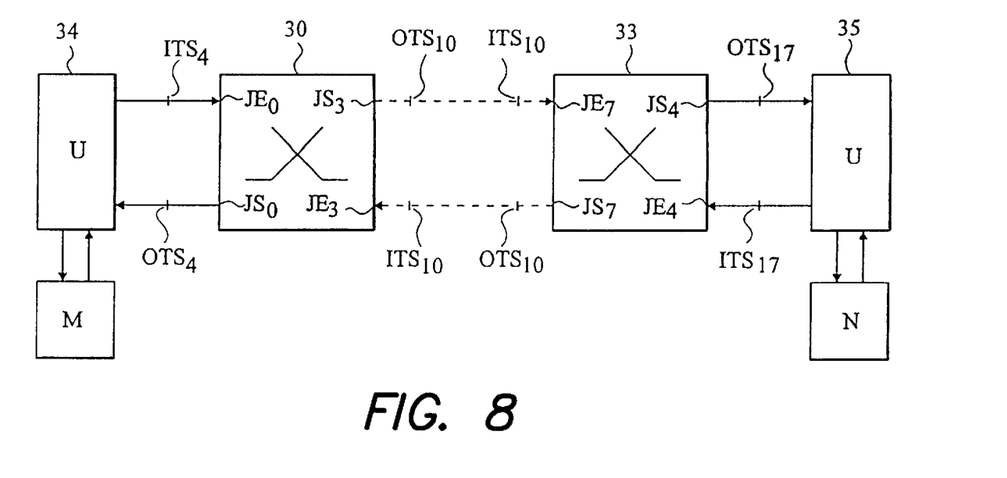
FIG. 8 illustrates, in the form of a block diagram, a second aspect of the present invention.
Figure 9:
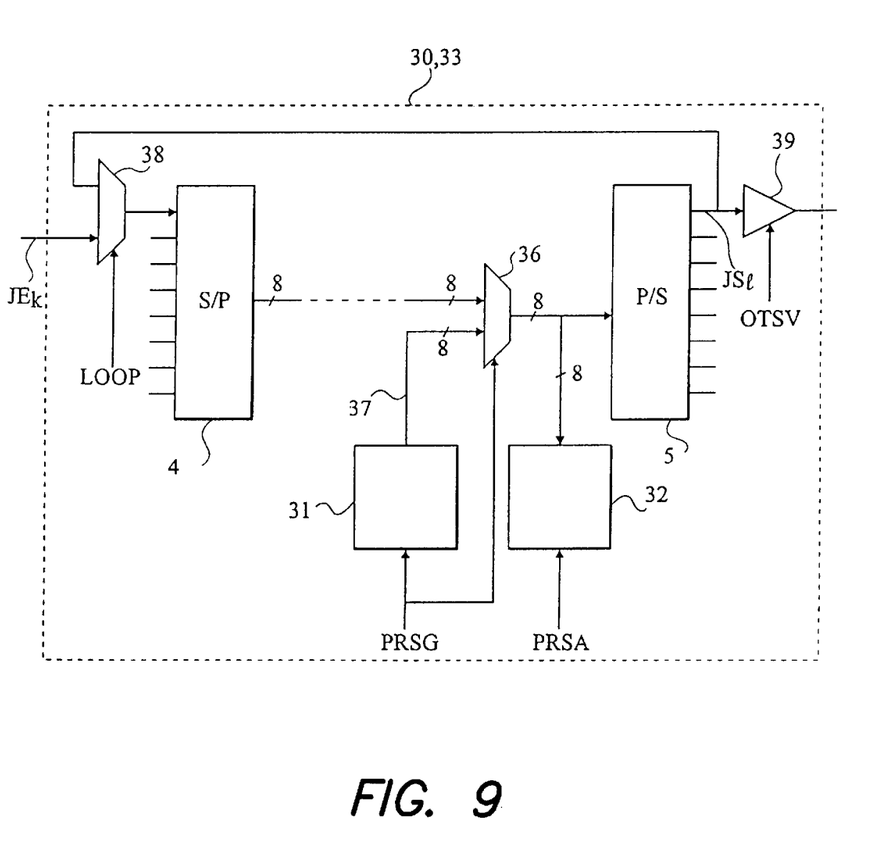
FIG. 9 shows, in the form of a block diagram, an embodiment of a switch matrix according to the second aspect of the present invention.

FIGS. 8 and 9 illustrate a second aspect of the present invention which uses assignment memory 2 or 2' to authorize, for example at the beginning of each transmission, a checking of whether a bidirectional connection has been established between two switch matrices.

A connection between two subscribers, the sender and the receiver, generally crosses several switch stages of a telephone switch center, and possibly even several telephone switch centers, and thus several switch matrices. The invention provides, according to this second aspect, a switch matrix means for checking that a bidirectional connection has effectively been established with another switch matrix of the connection.

FIG. 8 illustrates an example of a bidirectional path established between two subscribers. It is assumed that a bidirectional connection is established between a subscriber M and a subscriber N, the closest matrix to subscriber M being a first matrix 30 and a second matrix 33 being located between matrix 30 and subscriber N. In FIG. 8, subscribers M and N are assumed to be connected to interfaces U, respectively 34 and 35, constituting "level 1" of the connection. There can be other types of subscribers and/or other types of "level 1" interfaces, for example "S" interfaces or others.

In other words, the connection can, according to the invention, be checked between two switch matrices associated with boards separating "level 1" at each end of the connection, whatever path (shown in dotted lines) is followed by the connection between the two matrices 30 and 33. Other switch matrices can be crossed, for example, between matrices 30 and 33.

It is assumed that the data transmitted by subscriber M arrive on time slot $ITS_4$ of the input Junction $JE_0$ of matrix 30. It is also assumed that matrix 30 assigns the time slot $OTS_{10}$ of its junction $JS_3$ to this incoming time slot $ITS_4$. Matrix 33 assigns to the time slot $ITS_{10}$ that it receives, for example, on its input junction $JE_7$, the time slot $OTS_{17}$ of its output junction $JS_4$ for subscriber N. In the opposite direction, subscriber N transmits data on time slot $ITS_{17}$ of the input junction $JE_4$ of matrix 33. Matrix 33 assigns the time slot $OTS_{10}$ of its output junction $JS_7$ to this incoming time slot $ITS_{17}$. Matrix 30 assigns to the time slot $ITS_{10}$ that it receives on its input junction $JE_3$ the time slot $OTS_4$ of its output junction $JS_0$ for subscriber M.

In order to check the path established before establishing the communication, the microprocessor (not shown) associated with the subscriber board which includes one (for example, matrix 30) of the two matrices between which the path is to be checked, sets, in the assignment memory 2' of this matrix 30, at least one additional bit LOOP (FIG. 9) which indicates that a loop is to be performed to check the bidirectional path which has been established.

This bit LOOP can be considered as a bit for configuring a time slot of matrix 30 in a feedback loop mode. The feedback can be performed in transparent mode or not. Another additional bit associated with the time slot defines whether the feedback is operating in transparent mode or not. Preferably, a bit OTSV is used which indicates, independently from the feedback, whether a time slot is used or not. That is, this bit OTSV is able to set the output junction associated with this time slot at a high impedance during this time slot when it is not used, as will be seen in relation with FIG. 9. This corresponds, in the case of a feedback, to a non-transparent mode.

In the transparent mode, matrix 30 transmits the contents of the incoming time slot $ITS_{10}$ of junction $JE_3$ into time slot $OTS_4$ on junction $JS_0$ while it returns these contents to time slot $ITS_4$ of junction $JE_0$ as will be seen hereafter.

FIG. 9 shows an embodiment of matrices 30 and 33 according to the second aspect of the invention. For clarity, only the junctions and elements necessary to the understanding of this second aspect have been shown. For the rest, matrix 30 or 33 is similar, in structure as well as in operation, to the embodiment discussed in relation with FIG. 4 or 6. Although they have not been shown in FIG. 9, some elements of matrices 30 and 33 which will be designated by the reference numbers used in relation with FIG. 6 will be referred to.

A switch matrix 30 is, according to the invention, associated with a generator 31 of a pseudo-random sequence PRS and with an analyzer 32 of this pseudo-random sequence PRS.

Generator 31 is meant for transmitting pseudo-random sequence PRS. This pseudo-random sequence PRS is, according to the invention, contained within the matrix, for example, in the form of a shift register (not shown) associated with generator 31. Analyzer 32 is meant for examining the coherence of the pseudo-random sequence PRS received by this same matrix, upon its return.

According to the invention, a multiplexer 36 is placed between the data output $D_O$ of memory 20 (or of memories 11 and 12) and converter 5. This multiplexer 36 has the function of selecting, between the data output of memory 20 and an output 37 of generator 31 issuing sequence PRS, the data to be transmitted. Multiplexer 36 is controlled by a bit PRSG which at the same time enables generator 31 when a checking of the path is to be performed. The output of multiplexer 36 is also sent to analyzer 32 which is enabled by a bit PRSA. The analyzing of sequence PRS at the output of the matrix which issues it enables to check the path, including in the matrix.

Preferably, bits PRSG and PRSA are also contained in assignment memory 2'. Thus, the feedback can be performed without it being necessary for the microprocessor to act on generator 31 and on analyzer 32. Moreover, this enables a feedback to be performed for certain connections only.

According to the invention, each output junction $JS_l$ of converter 4 is sent to a first input of a feedback multiplexer 38, a second input of which receives the input junction of the same rank $JE_k$ (k=1). This feedback multiplexer 38 is controlled by bit LOOP. Thus, when bit LOOP is active, multiplexer 38 sends the data words that it transmits in the time slots $OTS_j$ of its output junction $JS_l$, back to its input junction $JE_1$ by placing them in the same time slots $OTS_i$ (i=j). The checking of the bidirectional path thus can, according to the invention, be performed by checking the paths established, including in the two end matrices of the connection.

The means for performing a feedback in transparent mode are constituted by three-state buffers 39 receiving the output junctions $JS_l$. These buffers are controlled according to the state of bit OTSV. The control of the buffers can involve other conditions (not shown) than those contained in bit OTSV. For clarity, a single multiplexer 38 and a single buffer 39 have been shown, whereas they are provided on all input junctions and all output junctions.

It should be noted that, to check a path between two matrices, one matrix generates and analyzes sequence PRS by enabling its generator 31 and its analyzer 32 by means of bits PRSG and PRSA while the other matrix performs the feedback by means of bit LOOP, whether in the transparent mode or not by means of bit OTSV.

Referring to FIG. 8, matrix 33 is assumed to check the establishing of the connection between matrices 30 and 33 by means of its generator 31 and its analyzer 32. For this purpose, matrix 33 transmits, on junction $JS_7$, sequence PRS in the time slots $OTS_{10}$ and examines the contents of the time slots $ITS_{10}$ that it receives on junction $JE_7$.

When the counter 9 of matrix 33 issues the address 01010 111 ($OTS_{10}$, $JS_7$), since the bit PRSG of the word contained at this address is active, eight bits of sequence PRS are issued, by generator 31 and via multiplexer 36, to converter 5 so that this converter transmits them in time slot $OTS_{10}$ onto junction $JS_7$. Since the bit PRSA of the word contained in memory 2' at the address 10001 100 ($OTS_{17}$, $JS_4$) is active, analyzer 32 is enabled to examine the contents of the word present at the input of converter 5 when counter 9 issues this address. This word thus corresponds to the time slot $ITS_{10}$ of junction $JE_7$, and therefore to the return of the bidirectional connection between matrices 30 and 33.

The feedback is performed by matrix 30. When the counter 9 of matrix 30 issues the address 00100 000 ($OTS_4$, $JS_0$), since the bit LOOP of the word contained at this address is active, the multiplexer 38 associated with matrix 30 then sends back the data word that it transmits in the time slot $OTS_4$ of its output junction $JS_0$, which corresponds to the word that it receives in the time slot $ITS_{10}$ of its input junction $JE_3$ (and thus to the sequence PRS), on its input junction $JE_0$ by placing it in time slot $ITS_4$. This word is thus returned to matrix 33.

When this word arrives in the time slot $ITS_{10}$ of the input junction $JE_7$ of matrix 33, it is examined by analyzer 32 which checks that it does correspond to the contents of the pseudo-random sequence PRS which has been transmitted.

It should be noted that the feedback according to the invention is performed by sending back the contents of the output time slots of matrix 30 and without modifying the switching performed by this matrix. Similarly, the transmission of sequence PRS by matrix 33 does not modify the switching performed by this matrix.

An advantage of the present invention, according to its above-described second aspect, is that the establishing of a connection can be checked whatever the type of the matrices crossed by the transmission, provided that the two matrices 30 and 33 from which the path is checked conform to the above-described embodiment. It should be noted that any matrix can be present between the two matrices 30 and 33.

Another advantage of the present invention is that, since a bit LOOP is associated with each time slot and the propagation through the matrices of the time slots is not altered, the path can be checked for certain time slots assigned to a communication while the other communications are transferred without any feedback.

Another advantage of the present invention is that the implementation of this second aspect does not require any modification of the organization of the data word storage within switch matrices 30 and 33. It is enough to increase the size of the words of assignment memory 2' in order to associate, with each time slot, the bits LOOP, PRSG, PRSA and OTSV and to associate, with matrices 30 and 33, a generator 31 and analyzer 32 of a pseudo-random sequence PRS and multiplexers 36 and 38.

Another advantage of this second aspect is that the pseudo-random sequence PRS contained in matrix 33 can be different from that contained in another matrix of same type in the connection. Since matrix 33, which issues the pseudo-random sequence PRS, is the matrix which has the function of analyzing the sequence, it does not matter if another matrix of the connection uses a different pseudo-random sequence PRS.

The proper establishment of the connection can be checked independently of the channel rate associated with this connection. That is, since the bits required for the feedback are contained in assignment memory 2', all the possible time slots of a same channel will be affected by the feedback.

Several matrices according to the invention can be paralleled, like conventional matrices, to constitute a concentrator.

Of course, the present invention is likely to have various alterations, modifications, and improvements which will readily occur to those skilled in the art. Particularly, each of the elements described may be replaced by one or several elements performing the same function. Similarly, although the preceding description was carried out in relation with a switch matrix of eight multiplexes of thirty-two time slots TS, the invention applies whatever the number of bits per time slot TS, whatever the number of time slots TS per multiplex, and whatever the number of multiplexes to be switched. It is enough, for this purpose, to adapt the size of the memories, of the counters and of the converters accordingly. Further, the rates which have been indicated as an example can be modified according to the application for which the matrix according to the invention is meant.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalent thereto.

What is claimed is:

1. A matrix for switching between an input group and an output group of at least two time-division multiplexes including:

a first, second and third buffer for storing data arriving in multiplex at input junctions to issue these data in multiplex on output junctions according to an assignment, by an assignment memory, of each time slot of an input multiplex to a time slot of an output multiplex, the first buffer being provided for receiving the data relative to transmissions as they are issued by a series-to-parallel converter receiving the input junctions and for enabling, at least when the data belong to a transmission channel including a plurality of time slots of a same multiplex, to selectively transfer data stored in the first buffer to the second or third buffer;

two counters which, with the assignment memory, provide in a timely manner read and write addresses for the first, second and third buffers such that signals output to the plurality of output multiplexes are in proper time sequence, wherein one of the counters in addition selects to which of the second or third buffers data stored in the first buffer gets transferred;

further including an assignment memory, programmable by a microprocessor and which stores, for each outgoing time slot to be sent to one of the output junctions via a parallel-to-series converter, in addition to the address of an incoming time slot associated therewith and which is stored at the address of the outgoing time slot, an additional bit, the state of which differentiates a transmission channel including a single time slot from a transmission channel including several time slots of a same multiplex, wherein a data word associated with a transmission channel including a single time slot per multiplex frame is read, from the first buffer, at the address issued by the assignment memory to be directly sent to the parallel-to-series converter; and wherein the write address in the first buffer is issued by a first counter, the read address in the first buffer being obtained at least from a second counter associated with the assignment memory the second counter being in advance with respect to the first counter by a value such that the multiplex frames issued on the output junctions are synchronous with the multiplex frames arriving on the input junctions.

2. A switch according to claim 1, wherein the first counter is a ten-bit counter, the eight least significant bits of which represent the write address, within a buffer identified by the two most significant bits of this first counter, of a word contained in an incoming time slot the first counter being configured so that the two most significant bits take the value zero after the value two.

3. A switch matrix according to claim 2, wherein the eight least significant bits of the read address of a word meant to be issued on one of the output junctions and contained in one of the buffers are issued by the assignment memory, the two most significant bits of this address being provided, according to the state of the additional bit of the word read out from the assignment memory by the two most significant bits of the first counter or by an operator taking into account the shift between the two counters.

4. A switch matrix according to claim 1, wherein the microprocessor issues, when writing an address of an incoming time slot into the assignment memory at the address of an outgoing time slot a bit indicative of a bidirectional transmission to perform, after this writing, an exchange of the address and of the data sent by the microprocessor to write, at the address of the incoming time slot, the address of the outgoing time slot.

5. A switch matrix according to claim 1, wherein the assignment memory and the buffers have a read and write cycle length of at most one half-bit cycle, the possible selection between the read or write addresses of the buffers being performed by means of multiplexers with at least two inputs, the selection of which is performed from the bit clock of the multiplexes.

6. A matrix for switching between an input group and an output group of at least two time-division multiplexes including:

a first, second and third buffer for storing data arriving in multiplex at input junctions to issue these data in multiplex on output junctions according to an assignment, by an assignment memory, of each time slot of an input multiplex to a time slot of an output multiplex, the first buffer being provided for receiving the data relative to transmissions as they are issued by a series-to-parallel converter receiving the input junctions and for enabling, at least when the data belong to a transmission channel including a plurality of time slots of a same multiplex, to selectively transfer data stored in the first buffer to the second or third buffer;

two counters which, with the assignment memory, provide in a timely manner read and write addresses for the first, second and third buffers such that signals output to the plurality of output multiplexes are in proper time sequence, wherein one of the counters in addition selects to which of the second or third buffers data stored in the first buffer gets transferred;

including means for verifying that a bidirectional link between two subscribers through another switch matrix located on the path of the transmission between the two subscribers has been established; and wherein said verifying means comprise a generator of a pseudo-random sequence and an analyzer of this pseudo-random sequence, the pseudo-random sequence being generated by a shift register associated with the generator.

7. A switch matrix according to claim 4, wherein the assignment memory contains, at the address of each outgoing time slot, a bit for configuring the matrix in a feedback loop mode where it feeds back to an incoming time slot the contents of an outgoing time slot of same rank.

8. A switch matrix according to claim 7, wherein the series-to-parallel converter receives an output of a feedback multiplexer which selects, according to the state of the configuring bit, an input junction or an output junction of the same rank.

9. A switch matrix according to claim 7 or 8, wherein the assignment memory further includes, at the address of each outgoing time slot, two enable bits for the pseudo-random sequence generator and analyzer, respectively.

10. A matrix for switching between an input group and an output group of at least two time-division multiplexes, including:

a first, second and third buffer for storing data arriving in multiplex at input junctions to issue these data in multiplex on output junctions according to an assignment of each time slot of an input multiplex to a time slot of an output multiplex, the first buffer being provided for receiving the data relative to transmissions as they are issued by a series-to-parallel converter receiving the input junctions and for enabling, at least when the data belong to a transmission channel including a plurality of time slots of a same multiplex, to selectively transfer data stored in the first buffer to the second or third buffer;

an assignment memory, programmable by a microprocessor and which stores, for each outgoing time slot to be sent to one of the output junctions via a parallel-to-series converter, in addition to an address of an incoming time slot associated therewith and which is stored at an address of an outgoing time slot, an additional bit, a state of which differentiates a transmission channel including a single time slot from a transmission channel including a plurality of time slots of a same multiplex, wherein a data word associated with a transmission channel including a single time slot per multiplex frame is read, from the first buffer, at an address issued by the assignment memory to be directly sent to the parallel-to-series converter;

two counters which, with the assignment memory, provide in a timely manner read and write addresses for the first, second and third buffers such that signals output to the plurality of output multiplexes are in proper time sequence; and wherein each of the buffers is constituted by a distinct memory, the address for reading from the first buffer and for writing into one of the two other buffers being, at least for transmission channels including several time slots of a same multiplex, issued by the second counter, the address for reading from the other of the two buffers being then issued by the assignment memory.

11. A switch matrix according to claim 10, wherein the write address in the first buffer is issued by a first counter, the read address in the first buffer being obtained at least from a second counter associated with the assignment memory and the second counter being in advance with respect to the first counter by a value such that the multiplex frames issued on the output junctions are synchronous with the multiplex frames arriving on the input junctions.

12. A switch matrix according to claim 10, wherein the microprocessor issues, when writing an address of an incoming time slot into the assignment memory at the address of an outgoing time slot, a bit indicative of a bidirectional transmission to perform, after this writing, an exchange of the address and of the data sent by the microprocessor to write, at the address of the incoming time slot the address of the outgoing time slot.

13. A switch matrix according to claim 10, wherein the assignment memory and the buffers have a read and write cycle length of at most one half-bit cycle, the possible selection between the read or write addresses of the buffers being performed by means of multiplexers with at least two inputs, the selection of which is performed from the bit clock of the multiplexes.

14. A switch matrix according to claim 10, including means for verifying that a bidirectional link between two subscribers upto another switch matrix (33) located on the path of the transmission between the two subscribers has been established.

15. A switch matrix according to claim 14, wherein these means are constituted by a generator of a pseudo-random sequence and an analyzer of this pseudo-random sequence the pseudo-random sequence being generated by a shift register associated with the generator.

16. A switch matrix according to claim 14, wherein the assignment memory contains, at the address of each outgoing time slot a bit for configuring the matrix in a feedback loop mode where it feeds back to an incoming time slot the contents of an outgoing time slot of same rank.

17. A switch matrix according to claim 16, wherein the series-to-parallel converter receives an output of a feedback multiplexer which selects, according to the state of the configuring bit an input junction or an output junction of the same rank.

18. A switch matrix according to claim 15, wherein the assignment memory further includes, at the address of each outgoing time slot, two enable bits for the pseudo-random sequence generator and analyzer, respectively.

* * * * *

UNITED STATES PATENT AND TRADEMARK OFFICE
CERTIFICATE OF CORRECTION

PATENT NO. : 6,064,670  
DATED : May 16, 2000  
INVENTOR(S) : Claude Athenes, Jean-Claude Audrix and Jean-Claude Longchambon It is certified that error appears in the above-identified patent and that said Letters Patent is hereby corrected as shown below:

Column 7,
Line 61 should read as follows: are issued by parallel-to-series converter 5 are Signed and Sealed this Twelfth Day of June, 2001

*Attest:*

*Attesting Officer*

NICHOLAS P. GODICI  
*Acting Director of the United States Patent and Trademark Office*